Feb. 17, 1970 J. F. KRIPL 3,496,540

REGISTRATION MEANS FOR CHARACTER RECOGNITION APPARATUS

Filed April 30, 1965 3 Sheets-Sheet 1

INVENTOR.
JOSEF F. KRIPL
BY [signature]

INVENTOR.
JOSEF F. KRIPL
BY Frederick S. Perry Jr.

Feb. 17, 1970 J. F. KRIPL 3,496,540

REGISTRATION MEANS FOR CHARACTER RECOGNITION APPARATUS

Filed April 30, 1965 3 Sheets-Sheet 3

INVENTOR.
JOSEF F. KRIPL
BY Frederick S. Guy

United States Patent Office 3,496,540
Patented Feb. 17, 1970

3,496,540
REGISTRATION MEANS FOR CHARACTER RECOGNITION APPARATUS

Josef Franz Kripl, Binghamton, N.Y., assignor to Singer-General Precision, Inc., a corporation of Delaware Filed Apr. 30, 1965, Ser. No. 452,155
Int. Cl. G06k 9/00
U.S. Cl. 340—146.3 9 Claims

ABSTRACT OF THE DISCLOSURE

The disclosed embodiment of the present invention is an apparatus for maintaining registration between a character recognition device and the characters that are to be recognized. The registration apparatus generally includes a pair of spaced arrays of photosensitive elements, a fine positioning circuit connected to one of the arrays, and a coarse positioning circuit connected to the other of the arrays. Outputs of the positioning circuits are connected to drive a motor which positions the arrays with respect to the characters. One of the arrays being connected to the character recognition apparatus.

This invention relates to a character recognition apparatus and more particularly to a character recognition apparatus capable of identifying and distinguishing one character, or pattern symbol, from another, independent of the relative registration of the character with the viewing portion of the apparatus within wider limits than heretofore possible.

In general, a character recognition apparatus normally includes an optical-to-electrical transducer for converting printed, or other readily distinguishable indicia such as found on documents or magnetically imprinted checks for example, into electrical waveforms representative thereof. The waveforms are then serially compared with stored data, which may be a number of correlation networks or further electrical waveforms, each of which represent one of the pattern symbols to be identified, the resulting "best match" or "least difference" obtained from the comparison operation being thereafter employed by the apparatus to identify the pattern symbol. Further, the transducer sequentially views incremental areas of the character along a first substantially linear dimension, the entire character area being viewed by repeatedly viewing the character along the first dimension as the character is transported along a second linear dimension perpendicular to the first.

It may be seen that the waveform will shift in time in accordance with the relative registration between the character and the transducer thereby rendering the comparison operation difficult if not impossible. The present invention however, operates to ensure that registration between each character being viewed and the transducer is maintained within close tolerances. Further as is well known, a large majority of character recognition apparatuses are required to sequentially view a plurality of characters arranged in parallel rows or lines. An advantage of the invention is that it also operates to ensure that registration is maintained as the plurality of characters are viewed, or scanned, by the transducer. Additionally in order that all of the character lines may be accurately scanned in sequence, the invention includes novel circuitry for coarsely registering the transducer in correct position to scan the next line of characters upon the completion of scanning the previous line, the precision registration circuitry thereafter ensuring that the registration is maintained within the close tolerances.

It is an object of the invention, therefore, to provide a character recognition apparatus.

Another object of the invention is to provide an improved character recognition apparatus for correctly identifying characters relatively independent of the registration between the apparatus and the characters.

A further object of the invention is to provide a character recognition apparatus operable to sequentially scan lines of characters while maintaining proper registration between the apparatus and each individual one of the characters.

Still another object of the invention is to provide a character recognition apparatus including both coarse and fine positioning means to maintain registration between the apparatus and the characters that are to be recognized.

The invention accordingly comprises the features of construction, combination of elements, and arrangement of parts, which will be exemplified in the construction hereinafter set forth, and the scope of the invention will be indicated in the claims.

For a fuller understanding of the nature and object of the invention reference should be had to the following detailed description taken in connection with the accompanying drawings, in which.

As an aid in understanding the broad principles of the invention, a preferred embodiment is first described wherein the document is secured to a rotating drum and the several characters thereon are sequentially viewed by a row of photo-sensitive cells arranged parallel to the drum axis, other and different embodiments being hereinafter briefly described.

Figure 1:
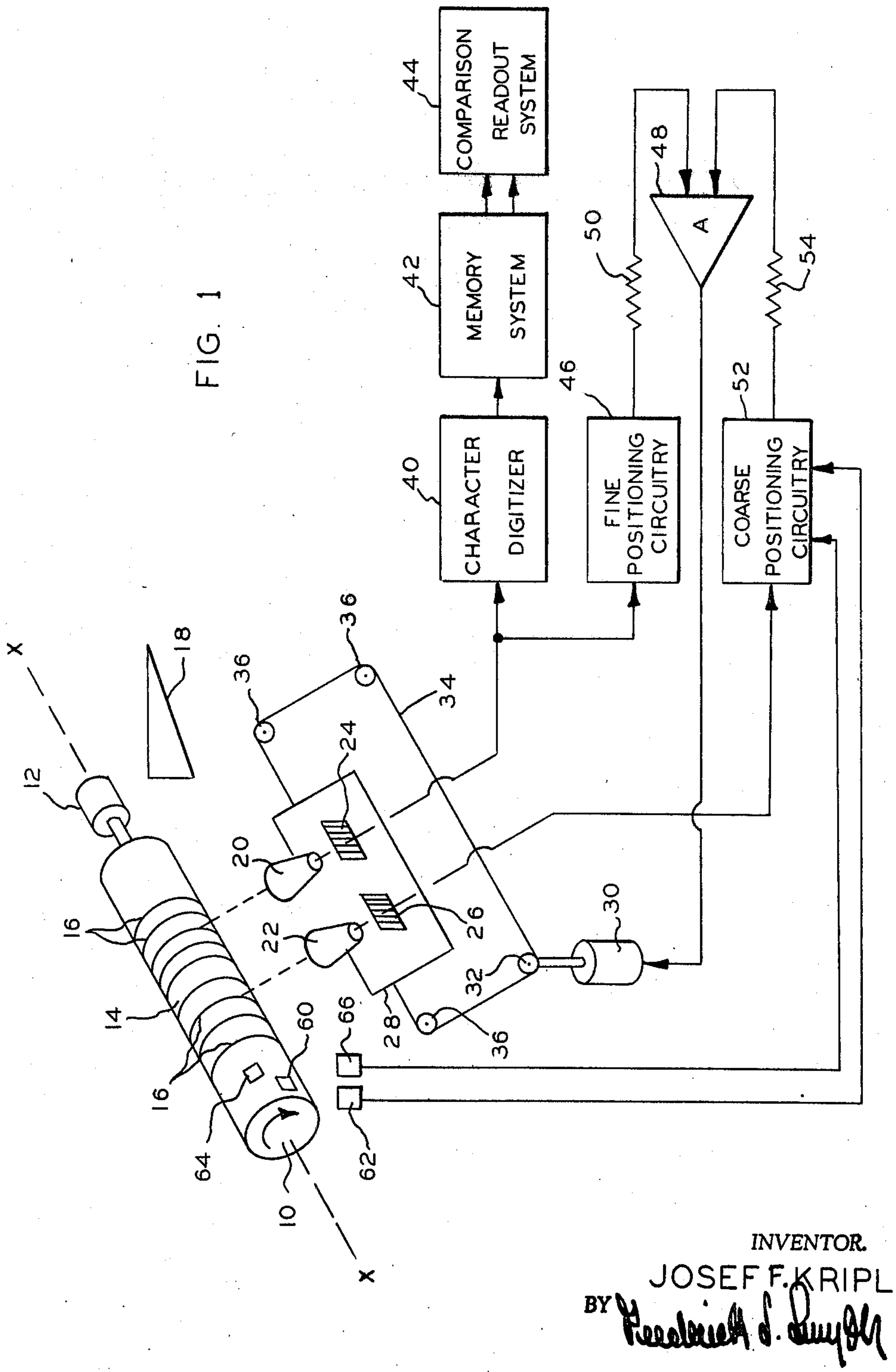
FIG. 1 is an elementary block diagram of a preferred embodiment of the character recognition apparatus of the invention.

Referring now to the drawings, FIG. 1 illustrates a preferred embodiment of the invention. As thereshown, a drum 10 is continuously rotated by a motor 12. Secured to drum 10, by vacuum or mechanical means, is a document 14 upon which are imprinted a number of parallel character lines generally indicated as 16. An apparatus which may be employed to deliver and secure document 14 to drum 10 may be that disclosed in U.S. Patent No. 3,166,310. Document 14 is illuminated by a light source 18 operable to project a uniform beam of light thereon. Reflected light from the document is collected by a pair of projection lenses 20 and 22 and imaged upon first and second horizontal arrays of photosensitive cells 24 and 26, respectively. The lens and photocells are mounted on a movable carriage 28 which is positioned by a servomotor 30, the output shaft of which rotates a drive pulley 32 having a belt looped therearound and attached to opposite sides of carriage 28. A number of idler pulleys 36 maintain carriage 38 parallel to, and spaced a fixed distance from, axis X—X of drum 10.

It may be seen that rotation of drum 10 is effective to cause each of the characters on individual ones of lines 16 to revolve past photo-cell arrays 24 and 26. In this manner the photo-cells scan the characters horizontally as a result of drum rotation. Further, a character digitizer 40 operates to scan the character vertically by electronically scanning the current output of the photo-cells comprising array 24 sequentially, to provide an electrical signal representative of all of the incremental areas of the character scanned. This electrical signal results from the fact that the intensity of the light reflected by the incremental areas occupied by the character differs in amount from the intensity of the light reflected by the blank or "white" areas of the document. Thus as the photo-cell currents are sequentially sampled by digitizer 40, the resultant and composite electrical signal is modulated by intensity of the reflected light incident upon each of the photo-cells included within array 24.

It may be seen therefore that character digitizer 40, in conjunction with the variations in the reflected light intensity collected by projection lens 20 and focused upon the photo-cells of array 24, provides an electrical signal in the form of a pulse train representative of the character scanned. The output of the digitizer is next applied to a memory system 42 whose principal function is to present either simultaneously or successively, a plurality of stored or reference pulse trains, each train being representative of an individual pattern symbol. The outputs of the memory system are then applied to a comparison readout system 44 which operates to determine and designate which of the characters stored in memory has just been scanned. This feature is obtained by counting the number of differences between bits of the scanned waveform and corresponding bits of each of the reference character waveforms available from memory system 42. When the scanning of a character is completed as determined by digitizer 40, the total number of differences from the comparison of the scanned signal with each of the reference signals are interrogated, and the reference signal which yields the least number of differences as a result of the comparison operation is designated as the character scanned. Since the character digitizer, the memory system, and the comparison readout system form no part of the present invention, they will not be further described herein; complete details of such devices which may be employed herein are to be found in copending application Ser. No. 149,144, filed Oct. 17, 1961 and assigned to assignee of this invention.

Also, as shown in FIG. 1, the output of array 24 is fed to fine positioning circuitry 46, the output of which provides a first input to amplifier 48 through scaling resistor 50. The output of array 26 is fed to coarse positioning circuitry 52, the output of which provides a second input to amplifier 48 through scaling resistor 54. During normal scanning operations, the output of amplifier 48 adjusts the position of the shaft of servomotor 30 to maintain the particular one of character lines 16 being scanned centered on the optical axis of lens 20. If for any reason the registration of line 16 and the optical axis of projection lens 20 tends to shift, the fine positioning circuitry provides an error signal to the first input of amplifier 48 of the proper magnitude and polarity to restore registration and reduce the magnitude of the error signal to zero.

During this same scanning operation, the output of coarse positioning circuitry 52 is inhibited. However, at this time array 26 is viewing the area wherein the next line is expected to occur. Coarse positioning circuitry 52 generates and stores an analog voltage proportional to the distance between the line being scanned by array 24 and the next line viewed by array 26. At the end of each scan this stored analog voltage is gated to the second input of amplifier 48 by spot 60 on drum 10 momentarily reducing the light reflected therefrom incident on a photomultiplier 62, which is effective to reduce its output current. Scaling resistors 50 and 54 are adjusted so that the analog signal from circuitry 52 overrides the signal from circuitry 46, if any. Coarse positioning circuitry 52 is reset by a further spot 64 on drum 10 momentarily reducing the reflected light incident on a photo-multipler 66.

Figure 2:
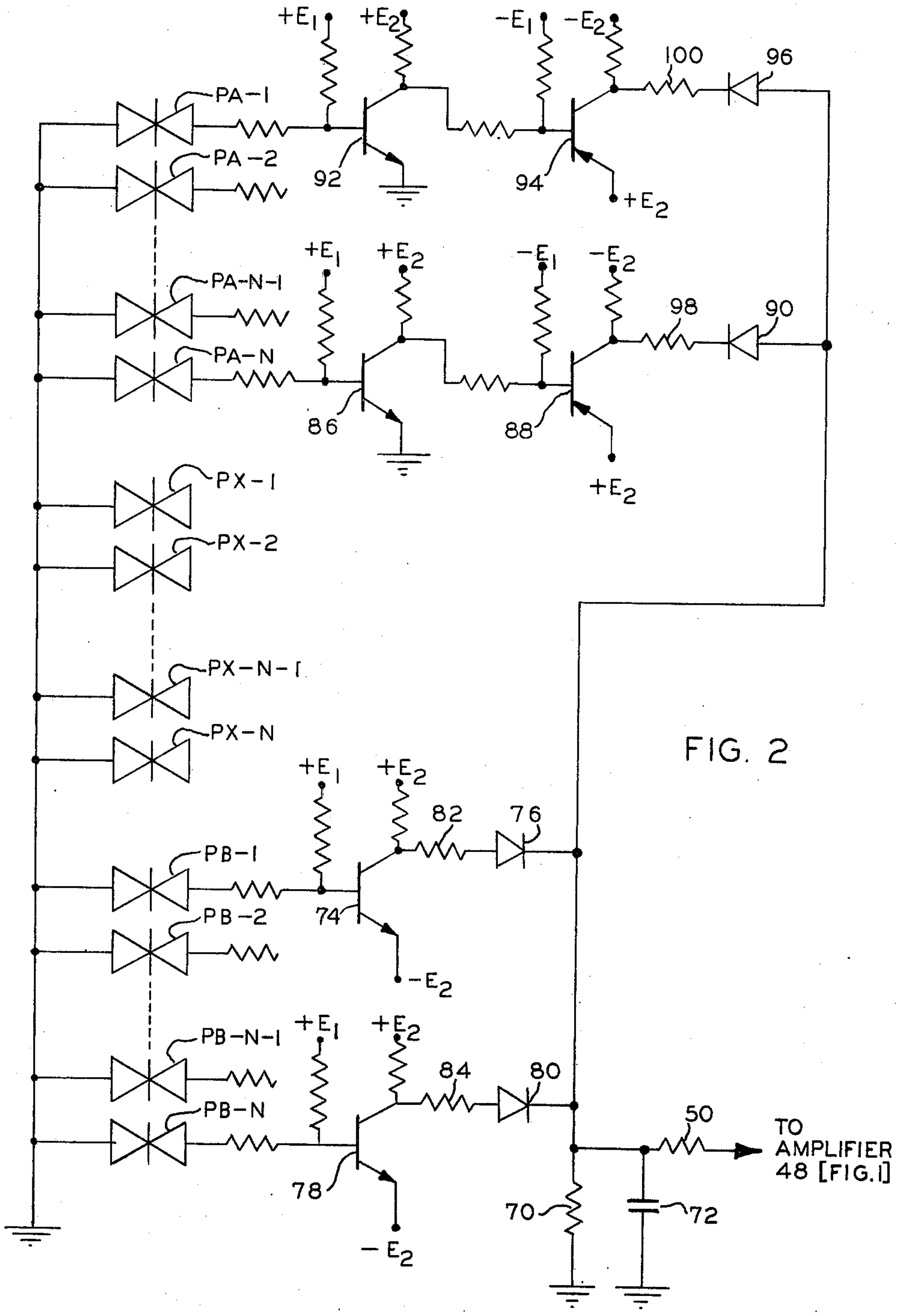
FIG. 2 is a partial schematic diagram of the fine positioning circuitry illustrated in block form in the embodiment of FIG. 1.

Referring now to FIG. 2 there is illustrated a partial schematic diagram of fine positioning circuitry 46. As there shown, array 24 (FIG. 1) is divided into three groups of photo-cells identified as the PA series, the PX series, and the PB series. As next explained, the PX series normally views the entire character, the PA series developing a negative error signal when any of these photo-cells view a portion of the character and, similiary, the PB series developing a positive error signal when any PB photo-cell views a portion of the character. As used in this specification, each of the photo-cells provide essentially ground or other reference potential when viewing a "white" or non-character area on the document being scanned and a more negative potential when viewing a "black" or character area. These error signals are developed across resistor 70 and capacitor 72 and applied to the first input of amplifier 48 to cause servomotor 30 to rotate in such a direction that the error signal is reduced to essentially zero in order that registration be maintained between the scanned line and optical axis of lens 20.

It may be seen from FIG. 2 that the outputs of the PX series of photo-cells are not used in fine positioning circuitry 46. The reason for this is that these photo-cells are selected to view the character and therefore determine only if the viewed incremental area of the character is black or white and do not aid in maintaining proper registration. As stated before, however, the PB series provides a positive error signal when any one of photo-cells PB–1 through PB–N views a portion of the character. Consider now the operation of photo-cell PB–1. Normally, transistor 74 is biased into conduction when photo-cell PB–1 views a white area, and under this condition, its collector is held at a reference potential, shown as $-E_2$ in FIG. 2. Thus, no potential is coupled through diode 76 to resistor 70. Should a portion of a character by viewed by PB–1 however, the output potential provided by the photo-cell falls to a negative potential sufficient to render transistor 74 non-conducting and its collector potential raises from $-E_2$ to $+E_2$. This potential is coupled through diode 76 to develop a positive potential across resistor 70.

This positive error voltage is couped to the first input of amplifier 48, the output of which causes servomotor 30 to rotate in a first direction so that the positive error signal is reduced essentially to zero. After servomotor 30 has again registered array 24 with the one of line 16 being scanned, so that photo-cell PB–1 again views a white area, transistor 74 conducts, its collector potential falls to $-E_2$, thereby removing the positive error signal developed across resistor 70. Photo-cells PB–2 through PB–N operate in similar fashion as may be seen from the interconnection of transistor 78 and diode 80 responsive to the output signal of photo-cell PB–N for example.

In order to obtain faster correction of any large misregistration, when scanning typewritten characters which are misaligned one to another, for example, weighted resistance values may be inserted between the collector of each transistor and the anode of the output diode as shown by resistors 82 and 84 in channels PB–1 and PB–N. The value of resistors 82 and 84 as well as the resistors in the remaining channels (not shown), are selected such that channel PB–N provides the greatest output error signal, while channel PB–1 provides the minimum error signal. In this manner, the greater the amount of misregistration, the greater the positive error signal applied to servomotor 30. This magnitude of the error signal thereafter decreasing in steps as registration is approached.

The operation of the PA series of photo-cells is essentially the same. Transistor 86 normally conducts when photo-cell PA–N views a white area, and its collector is at ground potential enabling the inverter stage transistor 88 to also conduct since its base is negative with respect to the emitter. The collector of transistor 88, therefore, is at a potential of $+E_2$ which is blocked by diode 90 so that no voltage is developed across resistor 70. Should a portion of a character be viewed by photo-cell PA–N, however, the negative potential provided thereby renders transistor 86 nonconductive and its collector raises to the $+E_2$ voltage which causes inverting transistor 88 to cease conduction. The collector of transistor 88 then falls to a potential of $-E_2$ which is coupled through diode 90 to develop a negative potential across resistor 70 and capacitor 72 and to the first input of amplifier 48, the output of which causes servomotor 30 to rotate in a second direction so that the developed negative error signal is also reduced essentially to zero. It may be seen therefore that whenever a PB or PA photo-cell views a character an error signal is applied to servomotor 30 to once again attain registration between the one of lines 16 being scanned and the optical axis of lens 20. When photo-cell PA–N once again views a white or no character area, transistor 86 conducts, its collector falls to ground potential enabling inverting transistor 88 to also conduct, thereby blocking the development of any further negative error signal across resistor 70. All of the PA channels are identical as shown by channel PA–1 which includes transistor 92, inverting transistor 94 and diode 96. As with the PB channels, faster correction speed may be obtained by employing weighted resistors, such as resistors 98 and 100, connected between the collector of the inverting resistor and the cathode of the output diode. It is important to note that the fine positioning operation above described is attained without the addition of extra photo-cells than heretobefore necessary to attempt to compensate for misregistration. Array 24 may include 24 central photo-cells in the PX series flanked on both sides by 12 photo-cells of the PA and PB series, respectively, although the exact number of photo-cells to be employed in a given installation depends, of course, on the resolution desired.

Capacitor 72, while smoothing out the step functions in the error voltage as registration is being attained when weighted resistors are employed, further functions to mask smudges or ragged non-uniform edges of the characters. Such defects may momentarily tend to develop an error voltage when viewed by any of the PA or PB series of photo-cells, but rapidly leave the field of view as the document revolves on drum 10. Thus, capacitor 72, which together with resistor 70 exhibits a relatively short time constant, prevents the build up of any appreciable error signal unless the misregistration photo-cells PA and PB actually view a character.

Figure 3:
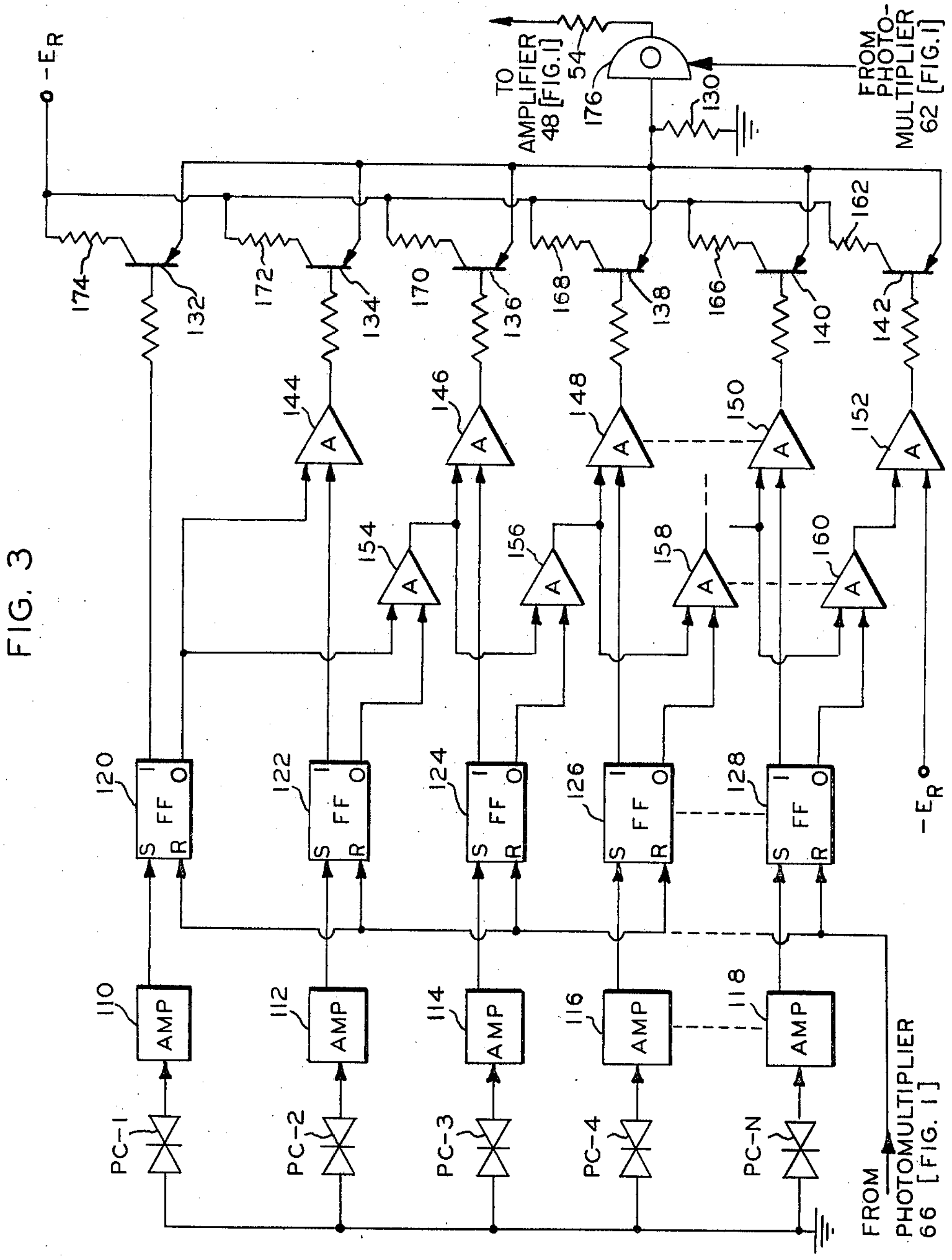
FIG. 3 is a partial schematic diagram of the coarse positioning circuitry illustrated in block form in the embodiment of FIG. 1.

Referring now to FIG. 3, there is illustrated a partial schematic diagram of coarse positioning circuitry 52. As thereshown, array 26 (see FIG. 1) comprises a further group of photo-cells PC–1 through PC–N, the output of each being fed to one of a group of conventional amplifiers 110, 112, 114, 116, and 118, respectively. Although only photo-cells PC–1 through PC–4 and PC–N are illustrated, it will be understood that as many photo-cells as desired may be included in array 26; eight, in general, being sufficient. Each amplifier is coupled to the set input of an associated one at flip-flops 120, 122, 124, 126, and 128. Depending on the distance between the line being scanned and the next line to be scanned, a unique analog voltage is developed across resistor 130 by turning on the proper one of transistors 132, 134, 136, 138, 140, or 142.

In the following analysis of the circuit of FIG. 3 it will be assumed that the on side of each flip-flop provides a negative potential. Thus, when a flip-flop is set, the 1 output line is negative and when a flip-flop is reset, the 0 output line is negative. Initially, as array 24 commences to scan a line of characters, all of the flip-flops are in the reset condition, that is all of the zero outputs are negative. It will be seen that the flip-flops feed two rows of AND circuits which, for convenience, may be labled the energization AND circuits 144, 146, 148, 150, and 152, and the interconnecting AND circuits 154, 156, 158, and 160. With all of the flip-flops reset, transistors 132, 134, 136, 138, and 140 are nonconducting as a result of the two rows of AND circuits. Note that transistor 132 cannot conduct because the negative output from flip-flop 120 is applied to one input of AND circuits 144 and 154 and not to the base of transistor 132. Similarly, transistor 134 remains cut off since, although one input to AND circuit 144 is negative the second input connected to the 1 output of flip-flop is not-negative at this time. However, AND circuit 154 does provide a negative output in response to both of the negative outputs of flip-flops 120 and 122. It may be seen that this pattern is repetitive, that is each of the energization AND circuits 144, 146, 148, and 150 block the application of the negative potential to the bases of transistors 134, 136, 138, and 140 since one input is connected to the not-negative output of the associated flip-flop. Note however, that all of the interconnecting AND circuits 154, 156, 158, and 160 provide the negative potential at the respective output terminal since both inputs to these AND circuits are coupled to the negative output of at least two flip-flops. Further note should be made of the fact that energization AND circuit 152 has a first input connected to the negative potential from interconnecting AND circuit 160 and a second input connected to reference potential $-E_R$. Thus, AND circuit 152 applies a negative potential to the base of transistor 142, switching it into the conduction state. Should array 26 not view a line of characters during the time interval array 24 is scanning one of lines 16, the value of resistor 162 in the collector circuit of transistor 142 is selected such that motor 30 will advance carriage 34 through a maximum displacement during the stepping time interval, in order that the next line to be scanned may be found as quickly as possible.

However, if any photo-cell does view a line of characters during the scanning time interval, or if more than one photo-cell views a line of characters, as is usually the case, transistor 142 is cut-off, and only the transistor nearest the line being scanned by array 24 is turned on. This operation may briefly be described as follows, it being understood that the photo-cells of array 26 are arranged in ascending order, with PC–1 being nearest the line being scanned. Assume, by way of example, that photo-cell PC–2 views a row of characters. The negative output therefrom, after amplification by amplifier 112, is effective to set flip-flop 122. The now negative output from the 1 output terminal of flip-flop 122 together with the negative output from the 0 terminal of flip-flop 120 now pass through AND circuit 144 to switch transistor 134 into conduction, collector resistor 172 determining the analog voltage developed across resistor 130. Simultaneously, the setting of flip-flop 122 removes the negative potential from the 0 terminal and closes interconnecting AND circuit 154 as well as all subsequent interconnecting AND circuits. Also note that the closure of AND circuit 160 also closes AND circuit 152, removing the negative potential from the base of transistor 162 thereby rendering it non-conducting. Thus, as a result of photo-cell PC–2 viewing a character or row of characters, all subsequent transistors, 136, 138, 140, and 142 cannot be energized during the scanning cycle. However, should photo-cell PC–1 view a character, flip-flop 120 is set, and the negative potential from the 1 terminal turns transistor 132 on.

Additionally, the now not-negative 0 terminal closes energized AND circuit 144 turning transistor 134 off. It thus may be seen that the illumination by a character of any of the PC photo-cells operates to both turn on an associated transistor as well as to inhibit the energization of all succeeding transistors. However, the illumination of a preceding PC photo-cell causes the energization of its associated transistor, and since the previously energized transistor is now a succeeding transistor it is turned off. In this manner, at the end of a scanning cycle one and only one transistor is conducting, and the conducting transistor develops the analog voltage which would have to be applied to servomotor 30 to properly position carriage 34, so that projection lens 20 views at least a part of the next line to be scanned. The necessary analog voltages are determined by the value of resistor 130 and of collector resistors 168, 170, 172, etc., as is well known by those skilled in the art.

The analog voltage developed across resistor 130 is supplied to the second input terminal of amplifier 48 and thus to servomotor 30 only during the stepping time interval. In general, a document covers only approximately 300° of the circumference of drum 10, allowing the time necessary for the drum to rotate through 60° for positioning of the carriage from line to line. If it is expected that sufficient time is not available to step the carriage from line to line during this period, then scanning can occur every other scan by the addition of a further spot on drum 10, another photomultiplier, and a flip-flop, the state of the flip-flop either inhibiting character digitizer 40 and fine positioning circuitry 46, or permitting normal operation.

In any event, the analog voltage developed across resistor 130 is gated to the second input of amplifier 48 by means of gate 176 under control of photomultiplier 62 (FIG. 1) which produces a negative pulse during the stepping time interval when viewing the reflected light from dark spot 60. At the end of stepping time, gate 176 is closed and remains closed until the next stepping time interval. After gate 176 is closed, the flip-flops, set during the previous scanning cycle, if any, are reset under control of the output from photomultiplier 66, thereby turning transistor 142 on, and array 26 is once again available to provide an analogue voltage proportionate to the distance to the next line to be scanned. It should be understood, and this is an important feature of the invention, that no extreme accuracy is required of coarse positioning circuitry 52 for the reason that once the line to be scanned is viewed by array 24, at the end of the stepping time interval, fine positioning circuitry 46 attains and maintains a high degree of registration.

Several extensions of the apparatus of the invention should now be apparent. Although for convenience a preferred embodiment of the invention has been illustrated using a rotating drum document feed device, it is obvious that the apparatus may be employed with almost any document feed system provided only that a servo drive system is coupled to the optical-to-electrical transducer. Alternatively a dual photo-sensitive element may be substituted for the PA and PB photo-cells with the output of the dual photo-sensitive element being coupled to a differential amplifier the output of which positions servomotor 30.

What has been described is an improved character recognition apparatus which not only maintains correct registration between a line of characters and the optical portion of the apparatus but simultaneously with the reading of the line of characters also measures and stores an analogue voltage, proportional to the distance between the line being read and the next line to be read, until needed. Further, the apparatus intermittently positions the optical portion of the apparatus when no line is found during a reading operation until either a line is found or an end of travel signal is generated.

It will thus be seen that the objects set forth above, among those made apparent from the preceding description, are efficiently attained, and since certain changes may be made in the above constructions without departing from the scope of the invention, it is intended that all matter contained or shown in the accompanying drawings shall be interpreted as illustrative and not in a limiting sense.

The embodiments of the invention in which an exclusive property or privilege is claimed are defined as follows:

1. A character recognition apparatus for identifying a plurality of characters arranged in rows upon a record member, comprising in combination:

first and second arrays of photo-sensitive elements each aligned in a first linear dimension operative to view an area past which a record member may be transported, each of said photo-sensitive elements providing an output signal of a first level when viewing a record member and of a second level when viewing one of said plurality of characters, said first array including a first end group, a center group, and a second end group of serial photo-sensitive elements;

means for transporting a record member in a second direction perpendicular to said first direction, said rows of characters being arranged on said record member parallel to said second direction and spaced apart from each other in said first direction;

drive means selectively operable for advancing said first and second arrays of photo-sensitive elements along said first direction;

first circuit means coupled to said first and second end groups of photo-sensitive elements of said first array for providing an error signal whenever any photo-sensitive elements within these groups generates an output signal of said second level, said first end group of photo-sensitive elements providing an error signal of one polarity and said second end group of photo-sensitive elements generating an error signal of another polarity;

means coupling said error signal to said drive means, said error signal being of the proper magnitude and polarity to maintain registration between a row of said plurality of characters and said center group of photo-sensitive elements of said first array;

second circuit means coupled to all of said photo-sensitive elements of said second array for providing an analog signal proportional to the distance between the row of plurality of characters being viewed by said center group of photo-sensitive elements of said first array and the next succeeding row of plurality of characters in accordance with the one of said photo-sensitive elements of said second array nearest said aligned first array which generates an output signal of said second level; and means intermittently coupling said analog signal to said drive means for advancing said first and second arrays of photo-sensitive elements.

2. The apparatus of claim 1 wherein said intermittent means advances said first and second arrays from one row of plurality of characters to the next succeeding row of a plurality of characters in response to indicia stored on said record member.

3. The apparatus of claim 1 wherein said first circuit means includes a plurality of signal transistors and an output terminal, there being at least one transistor connected between each photo-sensitive element of said first and second groups and said output terminal, each of said transistors biased into the conduction state when the associated one of said photo-sensitive elements provides an output signal of said first level and being nonconductive when said associated one of said photo-sensitive elements provides an output signal of said second level.

4. The apparatus of claim 3 further including a plurality of inverting transistors, one for each of said photo-sensitive elements of said second group;

means connecting each of said inverting transistors in series between an associated signal transistor and said output terminal; and means biasing all of said inverting transistors into the conduction state when the associated signal transistor conducts and into the non-conduction state when said associated signal transistor is rendered non-conductive by an output signal of said second level.

5. The apparatus of claim 1 wherein said second circuit means includes:

a plurality of flip-flops having set and reset input terminals and a plurality of switching transistors;

third circuit means connecting the output of each of said photo-sensitive elements of said second array electrically in series with the set input of one of said flip-flops and the set output terminal of each of said flip-flops to a control input terminal of a switching transistor;

AND circuit means combining the reset output terminal of each of said flip-flops with the set output terminal of the next succeeding flip-flop;

further AND circuit means combining the reset output terminal of each of said flip-flops with the reset terminal of the next succeeding flip-flop; and fourth circuit means connecting each output of said further AND circuit means to an input of the next succeeding plus one AND circuit means.

6. A character recognition apparatus for identifying a plurality of characters arranged in rows upon a record member comprising in combination:

first and second arrays of photo-sensitive elements aligned in a first direction;

means for sequentially moving said plurality of characters row-by-row past said first and second arrays of photo-sensitive elements in a second direction;

first circuit means responsive to certain ones of the photo-sensitive elements of said first array for generating a positive error signal whenever any of said certain ones of the photo-sensitive elements views a portion of said plurality of characters;

second circuit means responsive to certain others of the photo-sensitive elements of said first array for generating a negative error signal whenever any of said certain others of the photo-sensitive elements views a portion of said plurality of characters;

drive means coupled to said error signals and operable to maintain the remaining ones of said photo-sensitive elements, only, viewing said plurality of characters;

third circuit means coupled to said remaining ones of said photo-sensitive elements operable to scan the output of said elements to provide a serial wave train representative of each of said characters;

said second array being positioned to view at least one further row of characters succeeding said row of characters viewed by said first array;

fourth circuit means coupled to and responsive to said second array for deriving an analog signal proportional to the distance between the row of characters being viewed by said first array and the immediate next succeeding row; and means selectively coupling said analog signal to said drive means.

7. The apparatus of claim 6 wherein said record member includes encoded indicia; and further includes first means cooperating with one portion of said encoded indicia for actuating said selective means; and second means cooperating with another portion of said encoded indicia for resetting said fourth circuit means.

8. A character recognition apparatus comprising means for transporting an image of characters to be recognized across a recognition area, a first array of individual photosensitive cells including first and second groups of cells arranged transversely to the line of motion of the characters, said first and second groups of cells being spaced from one another by an amount substantially equal to the height of the characters and normally affected by light signals from the characters, said first group of cells providing a positive error signal when affected by light signals from any of the characters, said second group of cells providing a negative error signal when affected by light signals from any of the characters, positioning means coupled to said error signals for maintaining the light signals from the characters centered only between said first and second groups of cells, a second array of individual photo-sensitive cells spaced from said first array such that said arrays individually scan said image at areas spaced a distance substantially equal to the distance between individual lines of the characters, and means connected to said positioning means and responsive to said second array for deriving a signal proportional to the distance between the line of characters being viewed and the immediate next succeeding line.

9. A character recognition apparatus, comprising means for transporting characters to be recognized across a recognition area, a first array of individual transducers including first and second groups of transducers arranged transversely to the line of motion of the characters, said first and second groups of transducers being spaced from one another by an amount substantially equal to the height of the characters and being normally affected in accordance with the proximity of the characters, said first group of transducers providing error signal when affected by the proximity of any of the characters, said second group of transducers providing a negative error signal when affected by the proximity of any of the characters, positioning means coupled to said error signals for maintaining the characters centered between said first and said second groups of transducers, a second array of individual transducers spaced from said first array such that said arrays individually scan said image at areas spaced a distance substantially equal to the distance between individual lines of the characters, and means connected to said positioning means and responsive to said second array for deriving a signal proportional to the distance between the line of characters being scanned by said first array and the immediate next succeeding line.

References Cited

UNITED STATES PATENTS

| | | | |
|---|---|---|---|
| 2,769,379 | 11/1956 | Perry | 340—146.3 X |
| 3,142,761 | 7/1964 | Rabinow | 340—146.3 |
| 3,271,740 | 9/1966 | Rabinow | 340—146.3 |

MAYNARD R. WILBUR, Primary Examiner

R. F. GNUSE, Assistant Examiner

U.S. Cl. X.R.

250—219; 318—28